United States Patent
Okuda et al.

(10) Patent No.: US 9,674,385 B2
(45) Date of Patent: Jun. 6, 2017

(54) ELECTRONIC APPARATUS, OPERATION MODE CONTROLLING METHOD AND OPERATION MODE CONTROLLING SYSTEM

(71) Applicant: KYOCERA Document Solutions Inc., Osaka (JP)

(72) Inventors: Masaya Okuda, Osaka (JP); Tsuyoshi Nitta, Osaka (JP); Satoshi Kawakami, Osaka (JP); Yuri Moritani, Osaka (JP); Yoshitaka Matsuki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 5 days.

(21) Appl. No.: 14/903,556

(22) PCT Filed: Apr. 8, 2015

(86) PCT No.: PCT/JP2015/060901
§ 371 (c)(1),
(2) Date: Jan. 7, 2016

(87) PCT Pub. No.: WO2015/156300
PCT Pub. Date: Oct. 15, 2015

(65) Prior Publication Data
US 2016/0165087 A1     Jun. 9, 2016

(30) Foreign Application Priority Data
Apr. 8, 2014    (JP) .................... 2014-079517

(51) Int. Cl.
*B41J 29/38*    (2006.01)
*G06F 1/32*    (2006.01)
(Continued)

(52) U.S. Cl.
CPC ........ *H04N 1/00896* (2013.01); *B41J 29/38* (2013.01); *G03G 15/5004* (2013.01);
(Continued)

(58) Field of Classification Search
CPC .................................................. H04N 1/00896
See application file for complete search history.

(56) References Cited

U.S. PATENT DOCUMENTS

2013/0205156 A1* 8/2013 Niitsuma ............... G06F 1/3287
                                                         713/324
2013/0229684 A1* 9/2013 Yasuzaki ............ H04N 1/00127
                                                         358/1.15

FOREIGN PATENT DOCUMENTS

JP    2000-148312 A    5/2000
JP    2002-296983 A    10/2002
(Continued)

*Primary Examiner* — Ibrahim Siddo
(74) *Attorney, Agent, or Firm* — Hawaii Patent Services; Nathaniel K. Fedde; Kenton N. Fedde (57) ABSTRACT

There is provided a further saving in power consumption which is achieved by establishing an optimal transition from an ordinary operation mode to a power consumption saving mode. A mode switching management part (11c) as a mode switching part, while a communication of a managing part (11a) as a communication part to a mobile terminal (20) is being established, maintains an ordinary operation mode and when the communication of the management part (11a) to the mobile terminal (20) terminates, switches from the ordinary operation mode to a power consumption saving mode before an elapse of a specified power consumption saving time period.

15 Claims, 3 Drawing Sheets

(51) Int. Cl.
*H04N 1/00* (2006.01)
*G03G 15/00* (2006.01)
(52) U.S. Cl.
CPC ........... *G03G 15/5075* (2013.01); *G06F 1/32* (2013.01); *H04N 1/00* (2013.01); *H04N 1/00307* (2013.01); *H04N 2201/0094* (2013.01); *Y02B 60/50* (2013.01)

(56) References Cited

FOREIGN PATENT DOCUMENTS

| | | | |
|---|---|---|---|
| JP | 2003-054073 | A | 2/2003 |
| JP | 2004-090243 | A | 3/2004 |
| JP | 2011-205378 | A | 10/2011 |
| JP | 2013-254248 | A | 12/2013 |
| JP | 2002-086846 | A | 3/2014 |

* cited by examiner

ELECTRONIC APPARATUS, OPERATION MODE CONTROLLING METHOD AND OPERATION MODE CONTROLLING SYSTEM

FIELD OF THE INVENTION

The present invention relates to an electronic apparatus, an operation mode controlling method and an operation mode controlling system, each of which has a function of switching from an ordinary operation mode to a power consumption saving mode in an automatic manner.

BACKGROUND

Hitherto, an image forming apparatus such as an MFP (Multifunction Peripherals) as a composite device or a printer is provided with a power consumption saving function that switches, for reducing power consumption in a waiting state, from an ordinary operation mode to a power consumption saving mode in an automatic manner if no user operation is confirmed in a specified time period. Here, the power consumption modes include, for example, a low power consumption mode and a sleep mode.

The low consumption mode is a mode that causes a touch panel and lamps not to light. Under this mode, receiving a print data set or facsimile transmission will restore the ordinary operation mode for printing. On the other hand, the sleep mode is a mode that stops supplying an electric power to a fixing part in addition to causing the touch panel and lamps not to light. This operation mode, though it requires a longer time to start a printing job when compared to the low power consumption mode, makes it possible to provide a higher power consumption saving effect.

It is to be noted that a time period required for transition from the ordinary operation mode to the low power consumption mode can be arbitrarily set. Also, a time period required for transition from the low power consumption mode to the sleep mode can be arbitrarily set. It is to be noted that some models are not provided with the lower power consumption mode. In such a case, a time period required for transition from the ordinary operation mode to the sleep mode can be arbitrarily set. It is to be noted that the transition from the low power consumption or sleep mode to the ordinary operation mode is established when, for example, the touch panel is operated or an access from a mobile terminal occurs.

As an apparatus that has the aforementioned power consumption saving function, Patent Literature 1 proposes an image forming apparatus in which a switch is made between power consumption related modes depending on a distance to a mobile terminal that is held by a user.

PRIOR ART DOCUMENT

Patent Literature

Patent Literature 1: JP P2002-086846 A

SUMMARY

In the aforementioned Patent Literature 1, depending on a location of the mobile terminal, for example, a transition from the power consumption saving mode to the ordinary operation mode will be established and shorten a user's waiting time when a formed image is outputted. On the other hand, after completion of an execution of a requested job, switching to the power consumption saving mode depending on the location brings a power consumption saving effect.

However, in a case of the transition to the power consumption saving mode after the execution of the requested job completes, if the user does not move away from the image forming apparatus, the mode transition that depends on the distance to the mobile terminal cannot be established. In such a case, no transition to the power consumption saving mode is established before the arbitrary set time period (which will be referred to as "power saving time period") elapses. It is to be noted that the power saving time period is set in the form of how many minutes, how many hours, or the like from the completion of the job. Thus, between the completion of the requested job and the transition to the power consumption saving mode, the ordinary operation mode remains unchanged, which causes a problem of not achieving a further power consumption saving.

The present invention, which is made in view of the aforementioned circumstances, has an object to provide an electronic apparatus, an operation mode controlling method and an operation mode controlling system, each of which is capable of achieving a further power consumption saving.

An electronic apparatus according to the present invention features to include a communication part that is configured to communicate with a mobile terminal and a mode switching part that is configured to switch from an ordinary operation mode to a power consumption saving mode based on a specified power saving time period if no operation is made within a fixed time period, the mode switching part being configured to switch from the ordinary operation mode to the power saving mode before the power saving time period elapses, when the communication of the communication part with the mobile terminal terminates.

An operation mode controlling method, according to the present invention, which is to be implemented by a computer that controls an electronic apparatus, features to include the steps of: causing a communication part to communicate with a mobile terminal, and causing a mode switching part to switch from an ordinary operation mode to a power consumption saving mode based on a specified power saving time period if no operation is made within a fixed time period, wherein the computer is caused to implement a process in which the mode switching part switches from the ordinary operation mode to the power saving mode before the power saving time period elapses, when the communication of the communication part with the mobile terminal terminates.

An operation mode controlling system according to the present invention features to include a mobile terminal and an electronic apparatus, the mobile terminal including a first communication part that is configured to communicate with the electronic apparatus, and a control part that is configured to start an application program that requests the electronic apparatus to process a job, the electronic apparatus including a second communication part that is configured to communicate with the mobile terminal, and a mode switching part that is allowed to switch from an ordinary operation mode to a power consumption saving mode based on a specified time period if no operation is made within a specified time period, the first communication part being configured to transmit, when the application program in active is terminated, a notification of the resulting termination of the application program, the mode switching part being configured, when the second communication part receives the notification of the termination of the application program, to switch from the ordinary operation mode to the power consumption saving mode before the power saving time period elapses.

According to the electronic apparatus, the operation mode controlling method and the operation mode controlling system of the present invention, when the communication part terminates the communication with the mobile terminal, a switching is made from the normal operation mode to the power saving mode before the power saving time period elapses, which makes it possible to establish an optimal transition from the normal operation mode to the power saving mode, resulting in achieving a further saving in power consumption.

DETAILED DESCRIPTION

Figure 2:
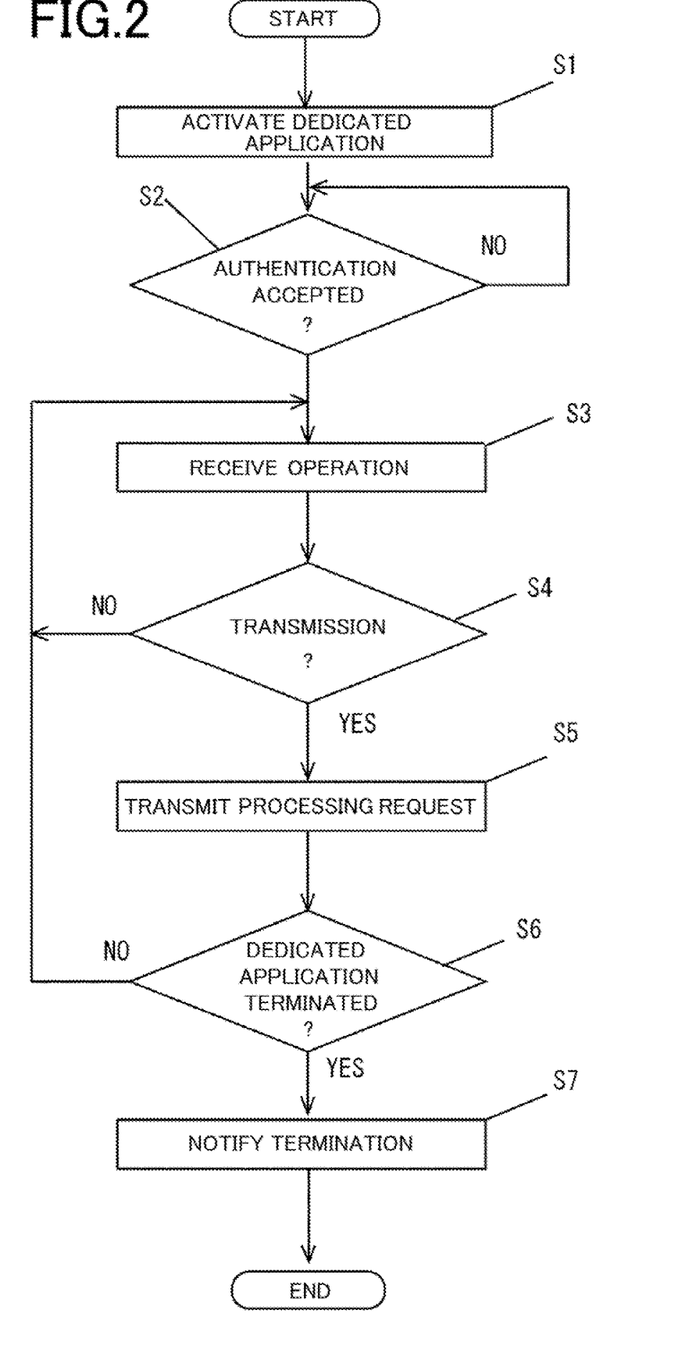
FIG. 2 is a flowchart that is indicative of an operation at a side of a mobile terminal shown in FIG. 1.
Figure 3:
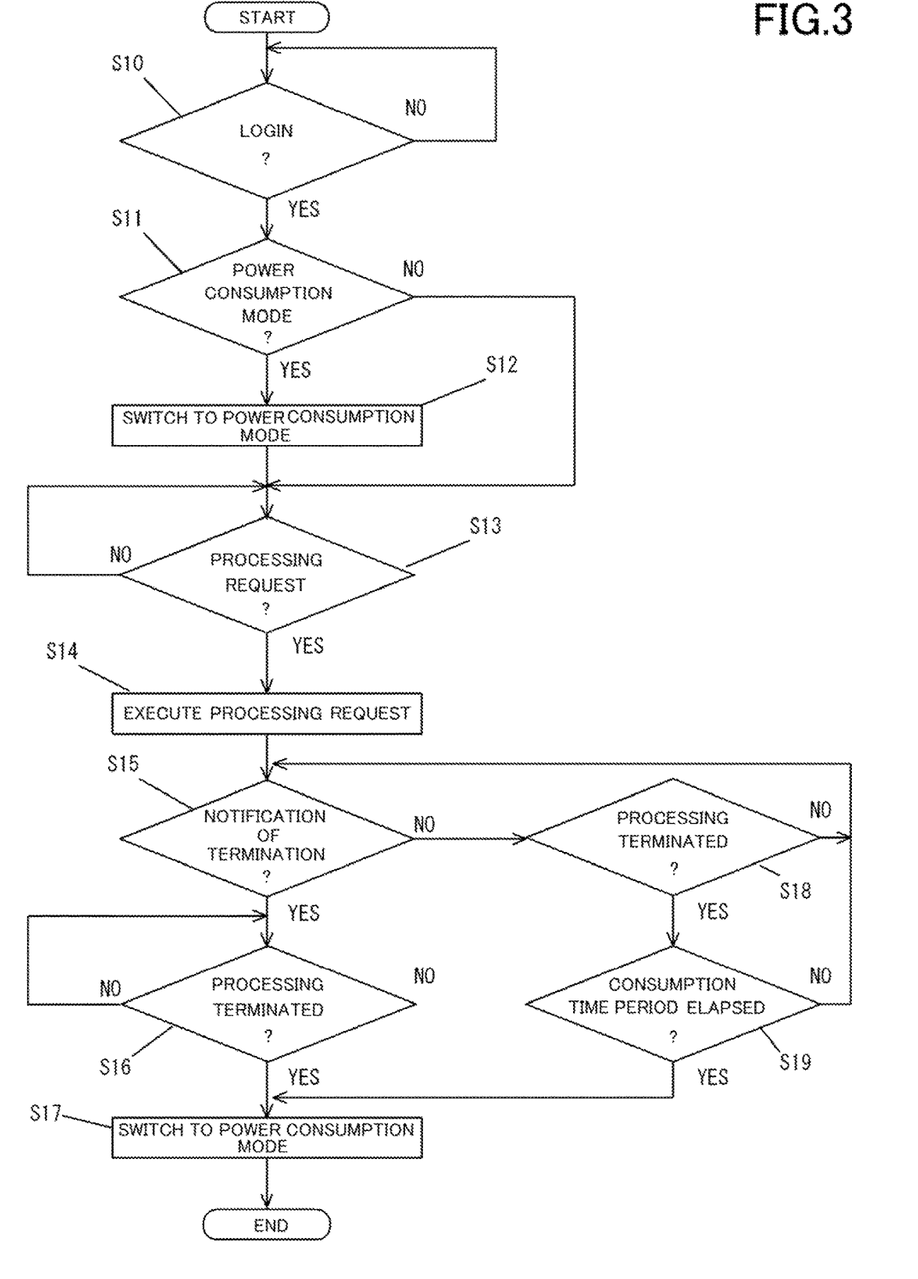
FIG. 3 is a flowchart that is indicative of an operation at a side of the image forming apparatus shown in FIG. 1.

Hereinbelow, an electronic apparatus according to an exemplary embodiment of the present invention will be described with reference to FIG. 1 to FIG. 3. In the following description, as an example of the electronic apparatus an MFP (Multifunction Peripheral) is referred to that is a complex apparatus configured to mount plural functions that include, for example, printing, FAX, and scanning functions.

In addition, this MFP is configured to download, for example, a printing job that is registered on a print server via a network such as a LAN (Local Area Network), a wireless LAN, and the Internet, and to output the resulting printing job after image processing (rasterization). Further, registering the printing job on the print server is established by, for example, a client terminal. Moreover, a process request of, for example, the printing job to the MFP may be made by a mobile terminal.

Figure 1:
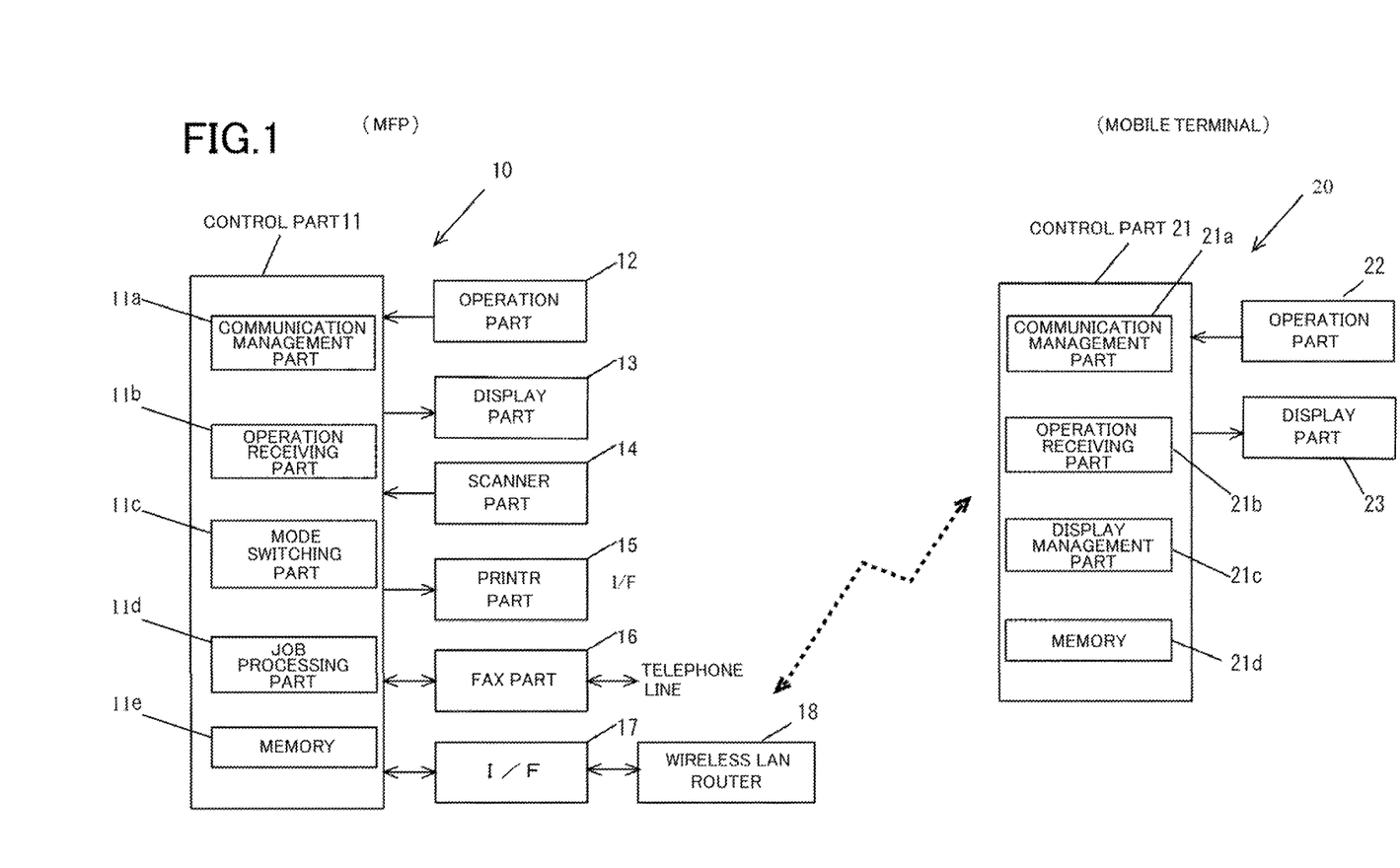
FIG. 1 is an example of an inner structure illustration of an image forming apparatus according to an exemplary embodiment of the present invention.

First of all, the MFP 10 as shown in FIG. 1 is capable of communicating with the mobile terminal 20 via the wireless LAN. Here, the MFP 10 includes a control part 11, an operation part 12, a display part 13, a scanner part 14, a printer part 15, a FAX part 16, and an I/F (Interface) part 17. The control part 11, which is configured to control an overall operation of the MFP 10 by order of programs stored on a ROM that is not illustrated, includes a communication management part 11a, an operation receiving part 11b, a mode switching management part 11c, a job processing part 11d, and a memory 11e.

The communication management part 11a is configured to receive the printing job from the print server (not illustrated) via the LAN that is connected to the I/F 17. It is to be noted that the received printing job from the print server (not illustrated) is transferred to the job processing part 11d. In addition, the communication management part 11a is configured to receive a process request for the printing job from the mobile terminal 20 via a wireless LAN router 18 that is connected to the I/F 17.

It is to be noted that a communication between the communication management part 11a and a communication management part 21a of the mobile terminal 20 remains established between, for example, an activation and a notification of a termination of a dedicated application that issues, at a side of the mobile terminal 20, a process request for the printing job to the MFP 10. That is to say, the notification of a termination of the dedicated application allows the communication management part 11a to understand that the communication to the communication management part 21a of the mobile terminal 20 has been terminated. It is to be noted that "termination of the dedicated application" means to include terminating an operation and display of the dedicated application.

The operation receiving part 18 is configured to receive an operation such as a designation of a printing job by the operation part 12. The mode switching management part 11c is configured to switch the operation mode of the MFP from the ordinary operation mode to the power consumption saving mode if no operation is confirmed during a specified time period. Here, the ordinary operation mode is an operation that is capable of supplying electric power to a driving circuit and the like which include, for example, a charger and fixing roller of the MFP 10 to restore to a condition that allows a requested job to execute. On the other hand, as described above, there are provided the low power consumption mode and the sleep mode as the power consumption saving mode. In addition, as described above, some models are not provided with the lower power consumption mode.

A transition from the power consumption saving mode to the ordinary operation mode is established in concurrence with, for example, the activation of the dedicated application at the side of the mobile terminal 20. In addition, a transition from the ordinary operation mode to the power consumption saving mode is established based on an arbitrary specified time period (which will be hereinafter referred to as "power saving time period"). However, for example, when the dedicated application that is active at the side of the mobile terminal 20 is caused to terminate, in response to a notification that is indicative of the termination of the dedicated application, before an elapse of the power saving time period, the transition is established from the ordinary operation mode to the power consumption saving mode. It is to be noted that the power saving time period is set in the form of, for example, how many minutes or how many hours from the termination of a specific job.

The job processing part 11d is configured to perform an image forming process (rasterization) on a printing job that is downloaded from the print server (not shown). The memory 11e is configured to store, for example, the printing job that is downloaded from the print server (not shown).

The operation part 12, which is to be operated for performing, for example, a designation of the printing job registered on the print server (not shown), is made up of, for example, a touch panel. It is to be noted that in a case of, for example, a process request for the printing job, a log-in process is executed to allow a user to have an authority of utilization. This log-in process is executed via the operation part 12 or via the dedicated application of the mobile terminal 20. The display part 13 is configured to display, for example, lists of a designation of the printing job, a guiding message for log-in or the like, and the printing job that is ready for printing.

The scanner part 14 is configured to input an image data piece of a manuscript that is read by an image sensor (not shown) to the control part 11 (the memory 11e). That is to say, the scanner part 14 is configured to convert image signals of the manuscript from the image sensor (not shown) into digitalized image data pieces and input the resulting digitalized image data pieces in a sequential manner to the control part 11.

The printer part 15 is configured to print an image on a paper sheet based on the image data piece that is outputted from the control part 11. That is to say, the printer part 15 is configured to cause a modulated laser light beam that is based on a rasterized image data piece outputted from the control part 11 to form an electrostatic latent image on a photosensitive drum (not shown). Supplying an amount of tonner causes the electrostatic latent image to form a tonner image and the resulting tonner image is transferred onto the paper sheet.

The FAX part 16 is configured to transmit the image data piece that is outputted from the control part 11 to an opposite facsimile via a telephone line and to receive an image data piece from the opposite facsimile to input the same to the control part 11. That is to say, the FAX part 16, while causing an NCU (Network Control Unit) that is not illustrated to control a connection to the telephone line, compresses and modulates the image data piece that is outputted from the control part 11 for transmission to the opposite facsimile. On the other hand, the FAX part 16, while causing the NCU to connect to the telephone line, demodulates and expands the image data piece from the opposite facsimile to input the same to the control part 11. The I/F, which is connected to, for example, the wireless LAN router and the LAN, makes it possible to establish a communication to each of the mobile terminal 20, the client terminal (not shown), and the print server (not shown).

It is to be noted that in a job of the copy function, the image data piece is inputted from the scanner part 14 to the memory 11e and is outputted from the memory 11e to the printer part 15. In a job of the printing function, the image data piece that is rasterized by the job processing part 11d is outputted to the printer part 15. In a job of the scanner function, the image data piece is inputted from the scanner part 14 to the memory 11e and is outputted from the memory 11e to the I/F 17.

In a job of the facsimile transmission function, the image data piece is inputted from the scanner part 14 (or the I/F 17) to the memory 11e and is outputted from the memory 11e to the FAX part 16. In a job of the facsimile reception, the image data piece is inputted from the FAX part 16 to the memory 11e and is outputted from the memory 11e to the printer part 15.

In addition, in a case where a pull-printing of the printing job is performed that is registered on the printing server (not shown) from the MFP 10, executing a log-in process, from the operation part 12, the mobile terminal 20 or the like, for confirming the user's authority of utilization causes a transmission of a user authentication information piece to the printing server (not shown) via the LAN.

In addition, a user authentication is performed at the side of the printing server (not shown), a list of the printing jobs is obtained that the user can print at the side of the MFP 10 and is displayed on the display part 13. On the other hand, in a case where a log-in process is performed from the mobile terminal 20, a list of the printing jobs that the user can print is displayed on a display part 23 that will be described later of the mobile terminal 20. Then, when the user manipulates the operation part 12 of the MFP 10 or an operation part 22 of the mobile terminal 20 to select the job that the user wants to print, the resulting printing job will be downloaded from the printing server (not shown) to be stored on the memory 11e. Regarding the stored printing job on the memory 11e, a PDL data piece is rasterized by the job processing part 11d based on setting data that is indicative of a printing setting included in the printing job. Then, an image is printed on the paper sheet based on the rasterized image data.

On the other hand, the mobile terminal 20, which is capable of transmitting a process request for printing job or the like to the MFP 10, is provided with a control part 21, the operation part 22, and the display part 23. It is to be noted that as the mobile terminal 20, a smart phone, tablet or the like is available. The control part 21, which is configured to control an overall operation of the mobile terminal 20 by order of programs stored on a ROM that is not illustrated, includes a communication management part 21a, an operation receiving part 21b, a display management part 21c, and a memory 21d.

The control part 21 activates a dedicated application for operation. On the other hand, the control part 21, in response to an operation for terminating the dedicated application (for example, a manipulation of a termination button (not shown) on the display part 23 for the dedicated application), terminates the dedicated application that is in active. In addition, in a case where no operation is confirmed that is indicative of terminating the dedicated application after processing a job is requested, after a specified time period (for example, 20 seconds) elapses, the dedicated application that is in active will be terminated.

The communication management part 21a establishes a wireless communication with the communication management part 11a of the MFP 10 via the aforementioned wireless LAN router 18. Activating the dedicated application makes it possible to establish this wireless communication. Also, activating the dedicated application makes it possible to perform the aforementioned log-in process for confirming an authority of utilization of a user and the information transmission that is indicative of a request for processing a printing job to the MFP 10. In addition, when the user authentication is performed at the side of the printing server (not shown), the communication management part 21a receives a list of printing job (s) that the user can print. Further, when the dedicated application that is activated at the side of the mobile terminal 20 is terminated, the communication management part 21a transmits a notification that is indicative of a termination of the dedicated application.

The operation receiving part 21b is configured to receive a content of operation that is performed by the operation part 22. The operation receiving part 21b, in response to an operation for terminating the dedicated application causes, for example, the dedicated application to activate or terminate that is for requesting a job processing at the side of MFP 10.

The display management part 21c is configured to cause, for example, the display part 23 to display the dedicated application and the like. On the memory 21d, there are stored programs including, for example, the dedicated application. The operation part 22, which is to be operated for performing, for example, a designation of the printing job registered on the print server (not shown), is made up of, for example, a touch panel. The display part 23 is configured to display, when the dedicated application is activated, for example, a guiding message for log-in or the like and the printing job that is ready for printing.

(Process at Mobile Terminal Side)

Next, with reference to FIG. 2, a process at a side of the mobile terminal 20 will be described. It is to be noted that the following description will be made as to a case where the mobile terminal 20 requests the MFP 10 to process a printing job. First of all, when the dedicated application is activated (step S1), the display management part 21c causes the display part 23 to display a content that prompts to perform a log-in. In concurrence with the activation of the dedicated application, a communication is established between the communication management part 21a and the communication management part 11a at the side of the MFP 10.

At this stage, inputting a user's unique ID, a password and the like will perform a user authentication at a side of the printing server (not shown) as described above. At the side of the mobile terminal 20, the user authentication is in waiting state (step S2: NO) and if the authentication is accepted (step S2: YES), the communication management part 21a obtains a list of the printing jobs that the user can print and causes the display part 23 to display this list. At this stage, if the printing job is selected by manipulating the operation part 22, the operation receiving part 21b receives the selected printing job (step S3). At this operation time, it is possible to designate the number of printing paper sheets and the like by manipulating the operation part 22.

After selecting the printing job and designating the number of printing sheets are completed, if, for example, a transmission button (not shown) on the display part 23 is manipulated, transmission completion is confirmed (step S4: YES) and the communication management part 21a transmits an information piece that is indicative of a request of processing a printing job to the side of MFP 10. (step S5). It is to be noted that a transmission standby state remains until the transmission button is manipulated (step S4: NO).

Then, after the transmission of the request for the processing, if, for example, a termination button (not shown) on the display part 23 is manipulated, the dedicated application is terminated (step S6: YES). At this time, an information piece that is indicative of the termination of the dedicated application is notified from the communication management part 21a to the communication management part 11 at the side of the MFP 10 (step S7), and immediately the communication is interrupted between the communication management part 21a and communication management part 11 at the side of the MFP 10.

It is to be noted that after transmission of the process request, if no manipulation of a termination button, which is not shown, on the display part 23 is confirmed (step S6: NO), the dedicated application will be terminated after an elapse of time period (for example, 20 seconds). Thereby, without user's action for terminating the dedicated application, the dedicated application will be brought into termination, which interrupts the communication between the communication management part 21a side and the communication management part 11a at the side of the MFP 10.

In addition, though the communication between the communication management part 21a and communication management part 11a at the side of the MFP 10 is established in concurrence with the activation of the dedicated application in step S1, sometimes the user terminates the dedicated application without performing a log-in to the MFP 10. In such a case, too, step 7 allows for a notification of the information piece that is indicative of the termination of the dedicated application. In addition, in a case where even no operation is confirmed while the dedicated application is held in active, an elapse of a time period (for example, 20 seconds) allows for a notification of an information piece that is indicative of the termination of the dedicated application.

(Process at MFP Side)

Next, with reference to FIG. 3, a process at a side of the MFP 10 will be described. It is to be noted that the following description will be made as to a case where the authentication at the side of the mobile terminal 20 has been accepted. First of all, in a case where the side of the MFP 10 is in a state of waiting for a log-in from the side of the mobile terminal 20 (step S10: NO), if a log-in from the side of the mobile terminal 20 is confirmed (step S10: YES), a mode switching management part 11c determines an operation mode at the side of the MFP 10 (step S11). At this stage, if the power consumption saving mode is determined, the mode switching management part 11c switches the operation mode at the side of the MFP 10 to the ordinary operation mode (step S12). To the contrary, if the power consumption saving mode is not determined (step S11: NO), no operation mode switching action is performed by the mode switching management part 11c.

Next, during the waiting state that waits for requesting a process of the printing job from the mobile terminal 20 side (step S13: NO), if a process request is confirmed (step S13: YES), the communication management part 11a downloads the printing job corresponding to the process request from the printing server (not shown). Then, a job process is executed based on the downloaded printing job. In detail, the job processing part 11d brings the printing job into an image process (rasterization) which is downloaded from the printing server (not shown). In addition, the printer part 15 prints an image onto the sheet paper based on the image-processed image data piece that is outputted from the control part 11 (step S14).

Next, a determination is made as to whether or not the notification of termination of the dedicated application is confirmed (step S15). At this stage, the notification of the termination of the dedicated application causes the communication management part 11a to recognize a termination of the communication with the mobile terminal 20. If the notification of the termination of the dedicated application is confirmed (step S15: YES), it is determined whether the job process is terminated (step S16). At this stage, determining that the job process is not terminated causes a job process waiting state (step S16: NO). To the contrary, when the job process is terminated (step S16: YES), the mode switching management part 11 immediately switches the operation mode of the MFP 10 side to the power consumption saving mode (step S17).

On the other hand, in step S15, no notification of the termination of the dedicated application is confirmed (step S15: NO), the termination of the job process is determined (step 18). At this stage, if the job process has not been terminated, a termination thereof will be in a waiting condition (step S18: NO). It is to be noted that during the waiting condition if in step S15, a notification of the termination of the dedicated application is confirmed, the control goes to steps S16 and S17.

Then, if the job process is terminated (step S18: YES), the mode switching management part 11c determines an elapse of the power consumption saving time period (step S19). It is to be noted that this power consumption saving time period is, as described above, a power consumption saving time period required for the transition from the ordinary operation mode to the power consumption saving mode.

Then, a waiting state is established that waits for an elapse of the power consumption saving time period and then if the power consumption saving time period elapses (step S19: YES), the mode switching management part 11c causes a change from the operation mode of the MFP 10 side to the power consumption saving mode (step S17). At this stage, while waiting for an elapse of the power consumption time period, if a termination of the dedicated application is noticed at step S15, the control goes to steps S16 and S17.

It is to be noted that the aforementioned transition from the ordinary operation mode to the power consumption saving mode is made in a direct manner in a case where no process request is confirmed (step S13) despite of, for example, a log-in at step S10 and a notification is transmitted from the mobile terminal 20 which notifies a termination of the dedicated application. In addition, though the communication is established with the mobile terminal 20 in concurrence with an activation of the dedicated application, sometimes the user terminates directly the dedicated application without logging in to the MFP 10. In such a case, as described above, a transition is made from the ordinary operation mode to the power consumption saving mode. Also, in a case where no operation is performed at the mobile terminal 20 side while the dedicated application is held activated, after a time period (for example, 20 seconds) elapses, a notification of a termination of the dedicated application is issued and then the aforementioned transition is made from the ordinary operation mode to the power consumption saving mode.

In such a way, in the present exemplary embodiment, the mode switching management part 11c that serves as a mode switching part maintains the ordinary operation mode while the communication of the communication management part 11a that serves as a communication part with the mobile terminal 20 is being established, and a termination of the communication of the communication management part 11a causes a switching from the ordinary operation mode to the power consumption saving mode. Thereby, the transition from the ordinary operation mode to the power consumption saving mode can be established in a smooth manner, which provides an enhanced power consumption saving.

In addition, in the present exemplary embodiment, in a case where no process for the printing job is requested despite of the log in from the mobile terminal 20 and the notification that is indicative of the termination of the dedicated application is confirmed, the aforementioned immediate transition from the ordinary operation mode to the power consumption saving mode makes it possible to switch immediately to the power saving consumption mode even though the operation mode is switched to the ordinary operation mode at a time of log in.

Further, the transition by the operation mode switching management part 11c from the ordinary operation mode to the power consumption saving mode is established when the job terminates that is requested from the mobile terminal 20, which makes it possible to perform the requested job without fail even though the communication with the mobile terminal 20 terminates.

Moreover, when the communication management 11a begins to communicated with the mobile terminal 20, the mode switching management part 11c switches from the power consumption saving mode to the ordinary operation mode. For this reason, the operation time period of the ordinary operation mode may be limited to a time period during which the communication management part 11a is in communication with the mobile terminal 20 or a time period required for terminating the job that is requested from the mobile terminal 20.

It is to be noted that though the present exemplary embodiment explains the MFP 10 as an electronic apparatus, other than this example, the present invention is applicable to an electronic apparatus that is capable of processing a job process in response to a request for processing a job as well as an image forming apparatus such as a printer.

What is claimed is:

1. An electronic apparatus, comprising a controller executing a program to function as:
   a communication part that is configured to communicate with a mobile terminal; and
   a mode switching part that is configured to switch from an ordinary operation mode to a power consumption saving mode based on a power consumption saving time period if no operation is confirmed within a specified time period,
   the mode switching part being configured to switch from the ordinary operation mode to the power consumption saving mode before the power consumption saving time period elapses, when the communication part receives a notification of the termination of a mobile terminal application program from the mobile terminal.

2. The electronic apparatus according to claim 1 further comprising a job execution part that is configured to execute a job process in response to a job process request, wherein the mode switching part switches to the power consumption mode, if the communication part receives the notification of the termination of the mobile terminal application program, when the requested job process is terminated.

3. The electronic apparatus according to claim 1, wherein the communication part is configured to determine a termination of the communication to the mobile terminal based on a specific notification from the mobile terminal.

4. The electronic apparatus according to claim 1, wherein the mode switching part is configured to switch from the power consumption saving mode to the ordinary operation switching mode when the communication part receives the notification of the termination of the mobile terminal application program between the communication being established and a job process request from the mobile terminal application program being received by the communication part.

5. The electronic apparatus according to claim 2, wherein the mode switching part switches from the ordinary operation mode to the power consumption saving mode when the specified power consumption saving time period elapses since the completion of the requested job, if the communication part does not receive the notification of the termination of the mobile terminal application program when the requested job process is terminated.

6. An operation mode controlling method to be implemented by a computer that controls an electronic apparatus, comprising the steps of:
   causing a communication part of the electronic apparatus to communicate with a mobile terminal; and
   causing a mode switching part of the electronic apparatus to switch from an ordinary operation mode to a power consumption saving mode based on a power consumption saving time period if no operation is confirmed within a specified time period, wherein the computer is caused to implement a process in which the mode switching part switches from the ordinary operation mode to the power consumption saving mode before the power consumption saving time period elapses, when the communication part receives a notification of the termination of a mobile terminal application program from the mobile terminal.

7. The operation mode controlling method according to claim 6, further comprising:
   causing a job execution part of electronic apparatus to execute a job process in response to a job process request,
   wherein the mode switching part is caused to switch to the power consumption mode if the communication part receives the notification of the termination of the application program when the requested job process is terminated.

8. The operation mode controlling method according to claim 7, wherein the mode switching part is caused to switch from the ordinary operation mode to the power consumption saving mode when the specified power consumption saving time period elapses since the completion of the requested job, if the communication part does not receive the notification of the termination of the mobile terminal application program when the requested job process is terminated.

9. The operation mode controlling method according claim 6, wherein
the mode switching part is caused to switch from the ordinary operation mode to the power consumption saving mode, when the communication part receives the notification of the termination of the mobile terminal application program between the communication being established and a job process request from the mobile terminal application program being received by the communication part.

10. An operation mode controlling system, comprising:
a mobile terminal; and
an electronic apparatus,
the mobile terminal including a controller executing a program to function as a first communication part that is configured to communicate with the electronic apparatus, and a control part that is configured to activate an application program that requests the electronic apparatus to process a job,
the electronic apparatus including a controller executing a program to function as a second communication part that is configured to communicate with the mobile terminal, and a mode switching part that is allowed to switch from an ordinary operation mode to a power consumption saving mode based on a power consumption saving time period if no operation is confirmed within a specified time period,
the first communication part being configured to transmit, when the application program that is in active is terminated, a notification of the resulting termination of the application program,
the mode switching part being configured, when the second communication part receives the notification of the termination of the application program, to switch from the ordinary operation mode to the power consumption saving mode before the power consumption saving time period elapses.

11. The operation mode controlling system according to claim 10, wherein the mobile terminal further includes an operation receiving part that is configured to accept an operation by a user, and the control part is configured to terminate, in response to a specific operation, the application program that is in active.

12. The operation mode controlling system according to claim 10, wherein the control part is configured to terminate the application program that is in active if no specific operation is confirmed after the job is requested to process, after a specified time period elapses.

13. The operation mode controlling system according to claim 10, wherein the electronic apparatus further comprises a job execution part that is configured to execute a job process in response to a job process request,
wherein the mode switching part switches to the power consumption mode if the second communication part receives the notification of the termination of the application program when the requested job process is terminated.

14. The operation mode controlling system according to claim 13, wherein the mode switching part switches from the ordinary operation mode to the power consumption saving mode when the specified power consumption saving time period elapses since the completion of the requested job, if the communication part does not receive the notification of the termination of the application program when the requested job process is terminated.

15. The operation mode controlling system according to claim 10, wherein
the first communication part establishes a communication to the second communication part when the application program is activated,
the mode switching part switches from the ordinary operation mode to the power consumption saving mode, when the second communication part receives the notification of the termination of the application program between the communication being established and a job process request from the application program being received by the second communication part.

* * * * *